US010261599B2

(12) United States Patent
Griffin

(10) Patent No.: US 10,261,599 B2
(45) Date of Patent: *Apr. 16, 2019

(54) ADDING INTERROGATIVE PUNCTUATION TO AN ELECTRONIC MESSAGE

(75) Inventor: Jason Tyler Griffin, Waterloo (CA)

(73) Assignee: BlackBerry Limited, Waterloo, Ontario (CA)

(*) Notice: Subject to any disclaimer, the term of this patent is extended or adjusted under 35 U.S.C. 154(b) by 619 days.

This patent is subject to a terminal disclaimer.

(21) Appl. No.: 13/034,152

(22) Filed: Feb. 24, 2011

(65) Prior Publication Data

US 2011/0167378 A1 Jul. 7, 2011

Related U.S. Application Data

(63) Continuation of application No. 10/887,279, filed on Jul. 8, 2004, now Pat. No. 7,921,374.

(51) Int. Cl.
G06F 3/048 (2013.01)
G06F 3/0481 (2013.01)
G06F 3/023 (2006.01)
G06F 3/0482 (2013.01)
G09G 5/22 (2006.01)

(52) U.S. Cl.
CPC .......... *G06F 3/0237* (2013.01); *G06F 3/0482* (2013.01); *G09G 5/222* (2013.01)

(58) Field of Classification Search
CPC ................ G06F 3/0482; G06F 1/1626; G09G 2370/027

USPC ......................................................... 715/780
See application file for complete search history.

(56) References Cited

U.S. PATENT DOCUMENTS

| 5,124,702 | A | 6/1992 | van Ardenne |
| 5,737,617 | A | 4/1998 | Bernth et al. |
| 6,067,514 | A * | 5/2000 | Chen .............................. 704/235 |
| 6,223,059 | B1 | 4/2001 | Haestrup |
| 6,307,548 | B1 | 10/2001 | Flinchem et al. |
| 6,359,572 | B1 | 3/2002 | Vale |
| 6,396,482 | B1 * | 5/2002 | Griffin et al. ................. 345/169 |
| 6,718,303 | B2 | 4/2004 | Tang et al. |
| 7,088,341 | B2 | 8/2006 | Koch et al. |
| 2004/0117352 | A1 * | 6/2004 | Schabes et al. .................. 707/3 |
| 2004/0138881 | A1 | 7/2004 | Divay et al. |
| 2005/0187754 | A1 * | 8/2005 | Suess ................................. 704/4 |

FOREIGN PATENT DOCUMENTS

| EP | 1031914 A2 | 8/2000 |
| WO | WO 99/15952 | 1/1999 |
| WO | WO 02/37472 A2 | 5/2002 |

OTHER PUBLICATIONS

Suess, U.S. Appl. No. 60/528,289.*

(Continued)

*Primary Examiner* — Tuyetlien T Tran
(74) *Attorney, Agent, or Firm* — Fish & Richardson P.C.

(57) ABSTRACT

Interrogative punctuation is automatically added to a sequence of characters entered into a handheld device upon termination of the sequence, such as by double actuation of the spacebar, when the first word, or the first and third words at the beginning of the sequence, of after a comma or semicolon, are indicative of an interrogatory.

33 Claims, 3 Drawing Sheets

(56) References Cited

OTHER PUBLICATIONS

IBM Corp., "Automatic Capitalization and Spacing of Sentences", IBM Technical Disclosure Bulletin, vol. 28, No. 9, Feb. 1986, pp. 4160-4161.
European Search Report for EP Application No. 04254101, dated Nov. 29, 2004 (9 pages).
Canadian Office Action for Application No. 2,511,714 dated Sep. 25, 2009 (3 pages).
EP Communication for Application No. 04254101.1-1527 dated May 8, 2006 (8 pages).
EP Extended Search Report for Application No. 07122685.6-1527 dated Jan. 18, 2008 (3 pages).
Canadian Office Action for Application No. 2,511,714 dated Nov. 27, 2008 (2 pages).

\* cited by examiner

ADDING INTERROGATIVE PUNCTUATION TO AN ELECTRONIC MESSAGE

This application is a continuation of U.S. patent application Ser. No. 10/887,279, filed on Jul 8, 2004, now U.S. Pat No. 7,921,374 entitled "Adding Interrogative Punctuation to an Electronic Message", the disclosure of which is incorporated herein by reference in its entirety.

BACKGROUND OF THE INVENTION

Field of the Invention

Aspects of this invention are related to increasing the efficiency of inputting interrogative punctuation into electronic messages, such as those generated in a handheld electronic device.

Background Information

Electronic messages, such as those communicated through handheld electronic devices, are often assembled through typing on a keyboard. Some such devices have a reduced keyboard with multiple characters, which can include punctuation marks, assigned to each key. Several schemes for disambiguating the multiple characters assigned to a key include selective action on the key, such as for instance rocking the key one way or another; actuation of a common additional, disambiguating input; or text interpretation. In the latter case, the device predicts the character that was intended by the user based upon a set of rules, or selects a character based on the probability that a word stored in a list in memory is being entered. Characters previously selected can change as additional keystrokes are entered and the possible combinations of characters intended narrows.

Commonly owned U.S. Pat. No. 6,396,482 discloses an electronic handheld device in which a sentence can be terminated by actuating the spacebar twice in succession. This action inserts a "." (period) at the end of the sentence, adds a space, and initiates capitalization of the next character input as the first letter of the first word of a new sentence. However, the "?" (question mark) shares a key and is selected by simultaneous actuation of a specialized key.

SUMMARY OF THE INVENTION

In accordance with one embodiment of the invention, interrogative punctuation is automatically added to a sequence of characters input to a handheld electronic device when the first word or a combination of the first and third words at the beginning of the sequence of characters or after a comma or semicolon is indicative of an interrogatory. The interrogative punctuation includes the placement of a "?" (question mark) at the end of the sequence of characters, and for the Spanish language, the additional insertion of "¿" (inverted question mark) at the beginning of the sequence of characters. Where the "?" (question mark) is added at the end of the terminated sequence of characters by depressing a spacebar twice in succession, a space can be added after the "?" (question mark).

More particularly, one aspect of the invention is directed to a method of inputting interrogative punctuation into text generated by a handheld electronic device comprising the steps of: inputting at least one sequence of characters comprising the text; examining the at least one sequence of characters for at least a first word at the beginning of the sequence or after a comma or semicolon indicative of an interrogatory; and inputting termination of the at least one sequence of characters and automatically adding the interrogative punctuation to the at least one sequence of characters when the at least first word at the beginning of the at least one sequence of characters is indicative of an interrogatory. Where the handheld electronic device has a keyboard including character keys and a full stop input, inputting the at least one sequence of characters comprises actuating the character keys and inputting termination of the at least one sequence of characters comprises actuating the full stop input. Where the full stop input is a spacebar, actuating the full stop input comprises actuating the space bar twice in succession to add a "?" (question mark) at the end of the at least one sequence of characters. This double actuation of the spacebar can also be used to enter a space after the "?" (question mark) and in one embodiment, capitalizing the first word of a second sequence of characters input following double spacebar activation.

The examining of the at least one sequence of characters for at least one word at the beginning indicative of an interrogatory can comprise storing a list of words indicative of an interrogatory when occurring at the beginning of the at least one sequence of characters, identifying the at least one word at the beginning of the at least one sequence of characters and searching the list for a match for that at least one word at the beginning of the sequence. The storing of the list of words can further comprise storing in the list selected combinations of first and third words indicative of an interrogatory when occurring at the beginning of the at least one sequence of characters, identifying the first and third words of the at least one sequence of characters and searching the list for a match for the first and third words.

Where the at least one sequence of characters defines a statement in the Spanish language, automatically adding interrogative punctuation comprises adding "¿" (inverted question mark) at the beginning of the at least one sequence of characters in addition to adding "?" (question mark) at the end of the at least one sequence of characters.

Another aspect of the invention is directed to a handheld electronic device comprising: a keyboard having a plurality of keys though which at least one sequence of characters can be input and a termination input through which the sequence of characters can be terminated; a display in which the at least one sequence of characters input is displayed; and a processor comprising means examining the at least one sequence of characters for at least one word in the beginning of the sequence of characters indicative of an interrogatory, and means for adding interrogative punctuation to the sequence of characters on the display when the termination input is actuated and the at least one word at the beginning of the at least one sequence of characters is indicative of an interrogatory. The means for examining the at least one sequence of characters can comprise a memory for storing a list of words that are indicative of an interrogatory when occurring at the beginning of the at least one sequence of characters, means identifying the at least one first word at the beginning of the at least one sequence of characters, and means searching the list for a match for the at least one word at the beginning of the at least one sequence of characters. In another embodiment, the memory further stores in this list selected combinations of a first word and a third word in at least one sequence of characters which are indicative of an interrogatory, the means identifying the first word that also identifies the third word in the at least one sequence of characters and the means searching the list also searches for a match for the first and third words in the at least one sequence of characters.

As to another aspect of the invention, the keyboard can further include means to override the interrogative punctuation.

BRIEF DESCRIPTION OF THE DRAWINGS

A full understanding of the invention can be gained from the following description of the preferred embodiments when read in conjunction with the accompanying drawings in which.

DESCRIPTION OF THE PREFERRED EMBODIMENTS

Figure 1:
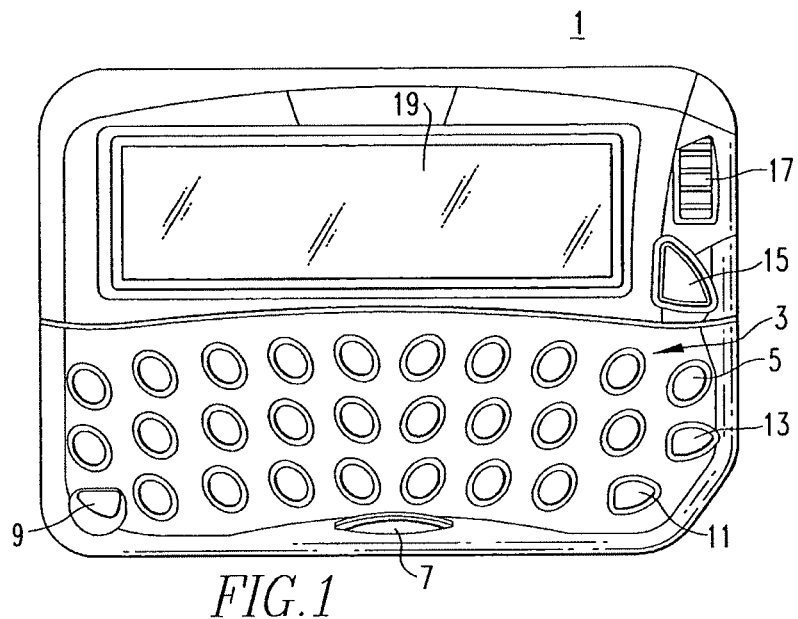
FIG. 1 is a front view of a handheld device incorporating the invention.

Aspects of the invention are directed to a method and an apparatus for automatically adding interrogative punctuation to electronic messages. FIG. 1 illustrates an exemplary handheld electronic device 1 through which the various aspects of the invention may be implemented. The device 1 has a keyboard 3 that includes a plurality of keys 5. In the exemplary embodiment of the invention, the keys 5 implement a "qwerty" keyboard. Alternatively, the keyboard 3 can have a reduced number of keys 5 where each key can input multiple characters. Even in the case of the "qwerty" keyboard of the exemplary device, the keys 5 can input additional characters beside the letters of the "qwerty" keyboard such as numerals and punctuation marks. The present invention may also be used with a full keyboard (not shown).

The keyboard 3 shown includes a number of specialized keys in addition to the keys 5. The specialized keys include a spacebar 7, an alt key 9, a cap key 11, a line feed key 13 and a backspace key 15. A thumbwheel 17 can be used to scroll through (by rotating) and selecting (by pressing the edge) entries on a display 19.

As is known, the device 1 can perform a number of functions, such as for example, sending and receiving e-mails wirelessly, recording notes, storing addresses, maintaining a calendar, and other functions. Many of these functions involve typing in text using the keyboard 3 in a well-known manner. The characters appear in sequence on the display 19 as they are entered. In accordance with an aspect of the invention, the spacebar 7 can also serve as a termination input for terminating the sequence of characters such as at the end of a sentence. This function is implemented by pressing the spacebar twice in succession. As discussed above, this double actuation of the spacebar 7 has been used prior to the present invention to place a "." (period) at the end of the terminated sequence of characters, e.g., the end of a sentence, to add a space after the "." (period) and to initiate capitalization of the next character as the first letter of the first word in a new sentence.

In accordance with this aspect of the present invention, this termination of the sequence of characters, such as by pressing the spacebar 7 twice in succession, results in the addition of interrogative punctuation to the sequence of characters when the first word of the sequence is indicative of an interrogatory. For example, the words "who," "what," "where," and "why" when appearing at the beginning of a sentence indicate that a question is being asked and interrogative punctuation needs to be added to the sequence of characters. Up to now, it has been necessary to manually add the proper punctuation by selecting the appropriate key or keys on the keyboard. In accordance with the invention, the interrogative punctuation is automatically entered when the sequence of characters is terminated such as by pressing the spacebar 7 twice. Other user action, other than pressing the spacebar twice in succession, may be used to terminate the sequence of characters and enter the interrogative punctuation. Use of the double actuation of the spacebar is particularly advantageous as it functions well with the previous practice of using this action to terminate declarative sentences and insert a period. When the two practices are combined, the proper punctuation is inserted with minimum strokes. It should be appreciated that the sequence of characters need not be a complete sentence. For instance, it is common to generate simple statements such as "why?" or "where?" in text messaging for convenience, and economy of time and effort. The sequence is terminated by the user initiating the termination of the sequence of characters at the desired point.

In accordance with an exemplary embodiment of the invention, the recognition of the first word in the sequence of characters is indicative of an interrogatory is carried out by determining if the first word matches any such words stored in a stored list. An exemplary list is set forth in Table 1 as follows:

TABLE 1

| are | aren't | how |
|---|---|---|
| can | can't | were |
| could | couldn't | why |
| does | doesn't | won't |
| is | isn't | who |
| should | shouldn't | whom |
| would | wouldn't | what |
| where did | where'd | when |
| | | where |
| | | whose |

The first word of the sequence of characters is determined by the first actuation of the spacebar in the sequence of characters. Of course, if the double actuation of the spacebar occurs before any single actuation, a one word interrogatory statement has been entered and the interrogative punctuation is inserted.

Interrogative punctuation entered automatically by the device is the "?" (question mark) at the end of the sequence of characters. If the Spanish language has been selected "¿" (inverted question mark) is also added at the beginning of the sequence of characters. As mentioned, the double actuation of the spacebar 7 can also enter a space after the "?" (question mark) and initiate capitalization of the first character entered in the next sequence of characters, i.e., the next sentence.

If the user does not want the interrogative punctuation, it can be removed manually and replaced by the desired punctuation using the keyboard. Some words that appear at the beginning of a sentence or statement may initiate a declaratory or interrogatory statement. The ambiguity may often be resolved by subsequent words in the sequence of characters. For instance, the word "do" may launch a declaratory statement; "Do it now." or an interrogatory statement "Do you have it?". Thus, in accordance with another aspect of the invention, the sequence of characters can also be examined for combinations of the first word with other words that are indicative of an interrogatory. In the example above, the first and successive (e.g., third or fourth) words combine to establish an interrogatory. The second word is not determinative. For instance, the second statement may be "Do we have it?". Thus, combinations of first and third words in the sequence of characters indicative of an interrogatory statement can be added to the list. Examples of such combinations of words are as follows:

TABLE 2

| do_have | does_have | do_care | does_care |
| do_want | does_want | do_need | does_need |
| do_know | does_know | | |

Words indicative of an interrogatory do not necessarily occur at the beginning of a sentence. For instance, an interrogatory sentence may begin with a prepositional phrase such as, "if it rains, what shall we do?". Thus, in accordance with another aspect of the invention, the list of words is searched for a match for the first word, or the first and third words occurring after a comma or a semicolon. Again, if automatic insertion of interrogative punctuation is not desired, it can be removed manually, but for most occasions, the correct punctuation will be automatically inserted, thereby expediting the message formation process.

Thus, in accordance with aspects of the invention, interrogative punctuation is inserted into text generated by a handheld device by: 1) inputting a desired sequence of characters; 2) examine the sequence of characters for the first word, or the first and third words at the beginning of the sequence or after a comma or semicolon, indicative of an interrogatory, and 3) inputting termination of the sequence of characters, such as by actuation of the spacebar twice in succession, and automatically adding interrogative punctuation to the sequence of characters when the first word or the first and third words at the beginning of the sequence or after a comma or semicolon, is or are indicative of an interrogatory.

While in the exemplary method, the first word or the first and third words, are identified and matched as the characters are inserted, this matching may be implemented at the time the input of the sequence of characters is terminated.

Figure 2:
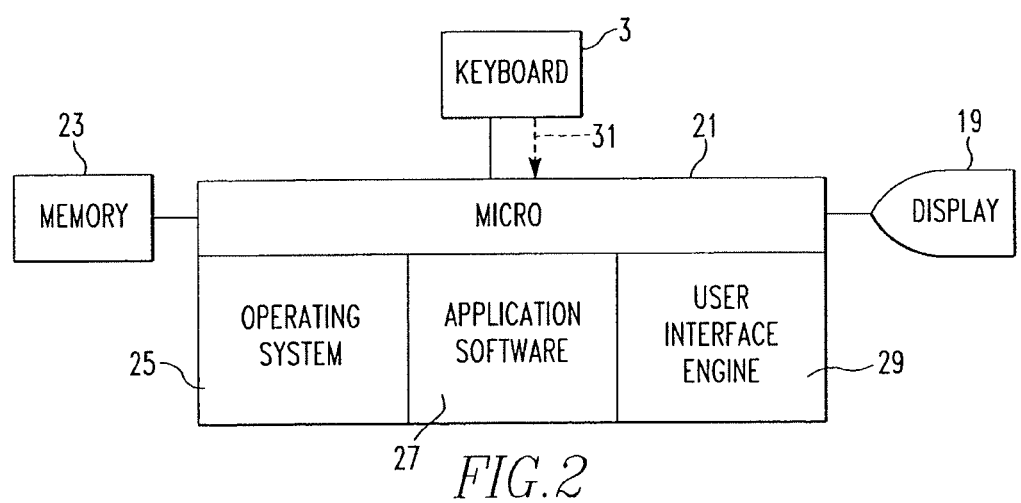
FIG. 2 is a block diagram of the major subsystems of the handheld . device of FIG. 1 relevant to the implementation of embodiments of the invention.

FIG. 2 illustrates in block form the major subsystems of the handheld device 1 involved in automatically adding interrogative punctuation to a sequence of characters. In accordance with this embodiment of the invention the major subsystems include the keyboard 3, a microprocessor 21, a memory 23, and the display 19. This microprocessor 21 runs various software including the operating system 25, applications software 27 and a user interface engine 29. The operating system 25 controls the overall operation of the microprocessor 21 including its interaction with the keyboard 3, memory 23 and display 19, as well as managing the operation of the remaining software, such as the application software 27 and user interface engine 29. Actuation of the keyboard 3 results in a keyboard signal 31 that is received by the microprocessor 21 and directed by the operating system 25 to the application software 27. The application software 27, in turn, performs the routine 33, illustrated in FIG. 3, that includes accessing lists of words stored in the memory 23—for example, those listed in Table 1. The user interface engine 29 controls generation on the display 19 of the message incorporating the interrogative punctuation in accordance with aspects of the invention.

Figure 3A:
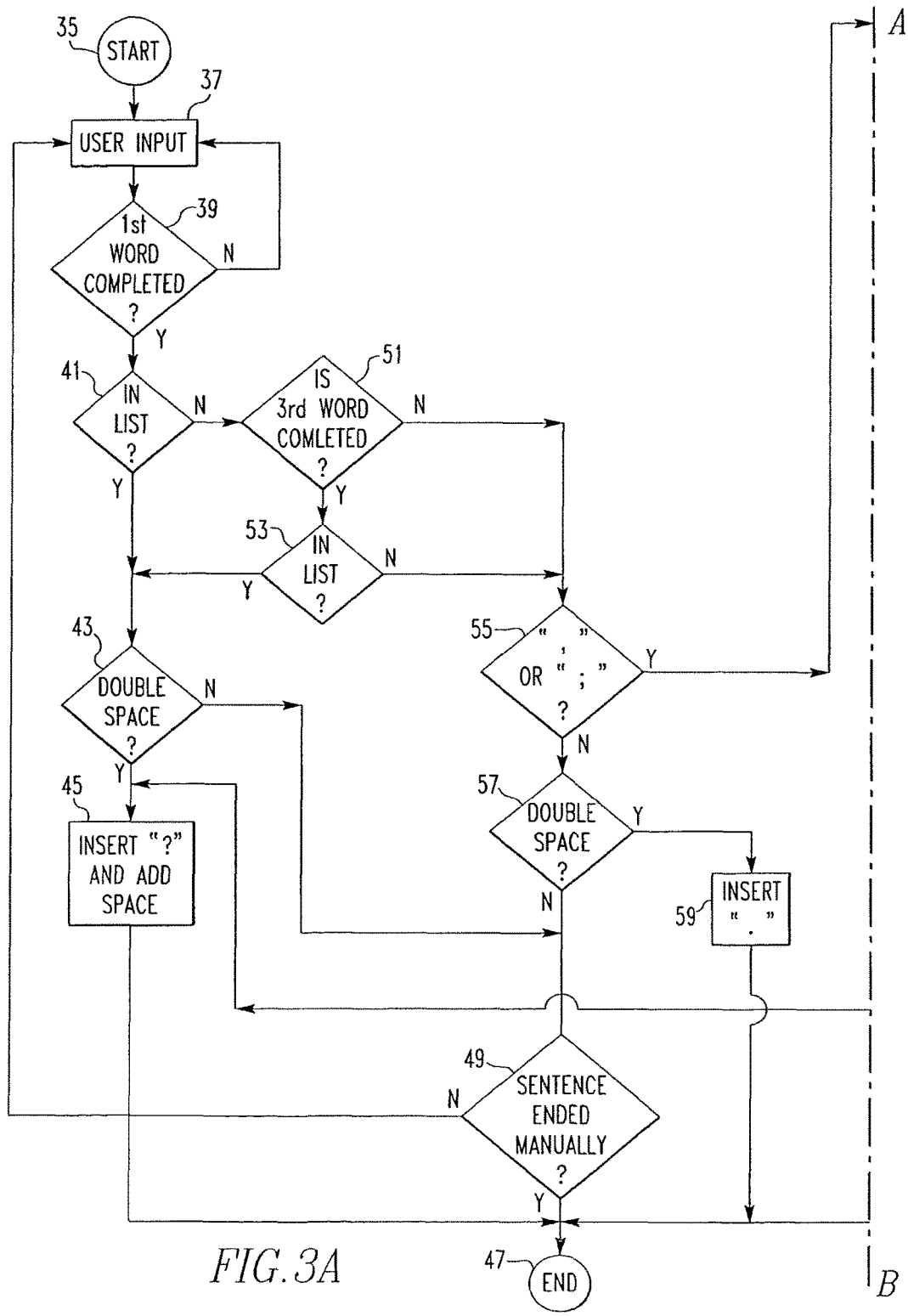
FIGS. 3A and 3B when placed side by side present a flowchart illustrating the major steps through which the exemplary embodiment of the invention is carried out.
Figure 3B:
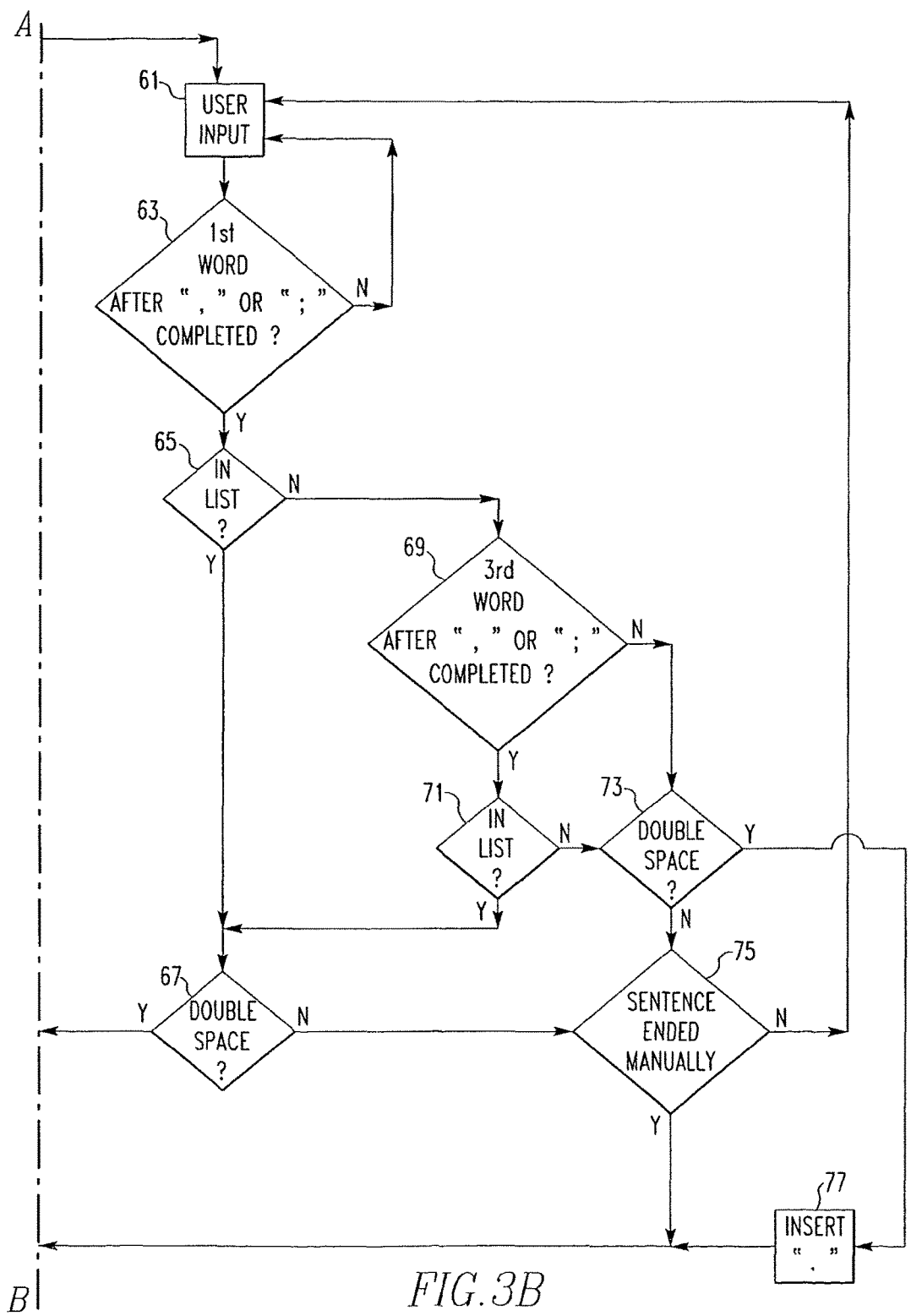

Turning to FIGS. 3A and 3B, the routine 33 when called at 35 monitors at 37 the user input in the form of the keyboard signals 31. As the sequence of characters is entered, the routine 33 checks at 39 for the end of the first word, which is indicated by a single actuation of the spacebar 7. If this first word is on the list of first words stored in the memory 23, which are indicative of an interrogatory as determined at 41, the inputs are monitored for termination of the sequence of characters as indicated by detection of the double actuation of the spacebar at 43. When this is detected, the interrogative punctuation is added at 45 by inserting the "?" (question mark). In addition, a space is entered after the "?" (question mark) and then the routine is exited at 47. Until the end of the sequence is detected by the entry of the double space at 43, a check is made at 49 for manual ending of the sequence of characters such as entry by the user of the "?" (question mark) by the customary sequence of keyboard signals. As long as the sequence of characters is not terminated, either by the detection of the double spacebar actuation at 43 or the manual ending of the sentence at 49, the routine 33 loops back to pickup the next user input at 37. If the first word is not on the list of first words indicative of an interrogatory when checked at 41, the sequence of characters entered is monitored for completion of the third word at 51. If the first and third words are in the list of words indicative of an interrogatory as detected at 53—for example, those listed in Table 2, then the routine waits for termination of the sequence of characters either though entry of the double actuation of the spacebar at 43 or the manual ending of the sentence at 49 in the manner described. In one embodiment, there are separate lists of first words and successive words (such as third words and/or fourth words). In another embodiment first and successive words are both on a single list. In yet other embodiments, there are separate lists for stand alone first words (e.g., why), first words that may require a successive word (e.g., do), and third words (e.g., have).

If neither the first word nor the combination of the first word and third word are in the lists of words indicative of interrogatories, a check is made at 55 for a comma or semicolon in the sequence of characters. If no comma or semicolon has been detected, and the sequence of characters is not terminated by double actuation of the space bar at 57, the routine 33 continues to cycle as each character is entered until the sentence is ended manually at 49. On the other hand, detection of double activation of the spacebar at 57, indicates termination of a declaratory statement (no interrogatory), and hence a "." is entered at 59 and the routine is exited at 47.

When a comma or semicolon is detected at 55 in the sequence of characters entered, the routine 33 operates similarly to before detection of a comma or semicolon by monitoring the additional characters entered at 61 looking for completion of the first word after the comma or semicolon at 63 and determining at 65 whether this word is on the list of first words indicative of interrogatory. If it is, and a double actuation of spacebar is detected at 67, then the interrogative punctuation is entered at 45. However, if the first word after the internal punctuation is not in the list, as detected at 69, then upon completion of the third word after the internal punctuation, these words are checked against the list of first and third words indicative of an interrogatory at 71. If the words are on the list, and subsequently a double spacebar actuation is detected at 67, the interrogative punctuation is entered at 45. Until the third word after the internal punctuation is completed, or after it is determined that these words are not on the list of words indicative of an interrogatory at 69, the routine 33 cycles back waiting for the next user input at 61 or ends the routine upon detection of a double space at 73 or of manual termination of the sentence at 75. Again, if the first word and the first and third words after a comma or semicolon are not on the lists indicating that the statement being typed is not an interrogatory, a "." (period) is entered at 77 when the sequence is terminated by double actuation of the space bar at 73.

While specific embodiments of the invention have been described in detail, it will be appreciated by those skilled in the art that various modifications and alternatives to those details may be developed in light of the overall teachings of the disclosure. Accordingly, the particular arrangements disclosed are meant to be illustrative only and not limiting as to the scope of the invention which is to be given the full breadth of the claims appended and any and all equivalents thereof.

What is claimed is:

1. A method of inputting punctuation in text generated by a mobile communications device having a processor coupled to a memory, the memory including stored words, a subset of the stored words being indicative of an interrogative expression, the method comprising:
   receiving user inputs reflecting a sequence of character inputs;
   generating text based on the sequence of character inputs;
   determining whether an initial word in the text matches any words in a list of single words indicative of an interrogative expression; and
   in response to determining that the initial word in the text does not match any words in the list of single words indicative of the interrogative expression:
      determining, by the processor, whether a combination of the initial word and a subsequent, non-consecutive word in the text is indicative of an interrogative expression, wherein the combination is identified independent of words between the initial word and the subsequent, non-consecutive word; and
      in response to determining that the combination of the initial word and the subsequent, non-consecutive word in the text is indicative of the interrogative expression:
         upon receipt of a user input reflecting a termination input, automatically displaying an interrogative punctuation character to the text, wherein the interrogative punctuation character is displayed without a user input reflecting actuation of two keys.

2. The method according to claim 1, wherein the subset of stored words includes a plurality of combinations of two non-consecutive words indicative of an interrogative expression.

3. The method according to claim 1, wherein one word is separating the combination.

4. The method according to claim 1, wherein two words are separating the combination.

5. The method according to claim 1, wherein the subsequent, non-consecutive word is in a third position of the sequence of words.

6. The method according to claim 1, wherein the subsequent, non-consecutive word is in a fourth position of the sequence of words.

7. The method according to claim 1, wherein adding the punctuation character includes inserting a "?" (question mark) at the end of the text, and inserting an inverted punctuation character at a beginning of the text.

8. The method according to claim 1, wherein the combination follows a punctuation in the text.

9. The method according to claim 8, wherein the punctuation in the text is one of a comma and a semi-colon.

10. The method according to claim 1, wherein the termination input is an actuation of a spacebar twice in succession.

11. The method according to claim 1, wherein the interrogative punctuation character is added to the text without actuation of an "alt" key.

12. A communications device comprising:
    a processor coupled to a memory, the memory including stored words, a subset of the stored words being indicative of an interrogative expression; and
    an input apparatus;
    the processor being adapted to:
       receive user inputs from the input apparatus reflecting a sequence of character inputs,
       generate text including a sequence of words associated with the sequence of character inputs,
       determine whether an initial word in the text matches any words in a list of single words indicative of an interrogative expression; and
       in response to determining that the initial word in the text does not match any words in the list of single words indicative of the interrogative expression:
          determine whether a combination of the initial word and a subsequent, non-consecutive word is indicative of an interrogative expression, wherein the combination is identified independent of words between the initial word and the subsequent, non-consecutive word; and
          in response to determining that the combination of the initial word and the subsequent, non-consecutive word is indicative of the interrogative expression:
             automatically add an interrogative punctuation character to the text upon receipt of a user input reflecting a termination input, wherein the interrogative punctuation character is added without a user input reflecting actuation of two keys.

13. The device according to claim 12, wherein the subset of stored words includes a plurality of combinations of two non-consecutive words indicative of an interrogative expression.

14. The device according to claim 12, wherein one word is separating the combination.

15. The device according to claim 12, wherein two words are separating the combination.

16. The device according to claim 12, wherein the subsequent, non-consecutive word is in a third position of the sequence of words.

17. The device according to claim 12, wherein the subsequent, non-consecutive word is in a fourth position of the sequence of words.

18. The device according to claim 12, wherein adding the punctuation character includes inserting a "?" (question mark) at the end of the text, and inserting an inverted punctuation character at a beginning of the text.

19. The device according to claim 12, the combination follows a punctuation in the text.

20. The device according to claim 19, wherein the punctuation in the text is one of a comma and a semi-colon.

21. The device according to claim 12, wherein the termination input is an actuation of a spacebar twice in succession.

22. The device according to claim 12, wherein the interrogative punctuation character is added to the text without actuation of an "alt" key.

23. A user interface for adding an interrogative punctuation character to a text comprising:
    an input apparatus configured to receive user inputs reflecting a sequence of character inputs and a user input reflecting a termination input;

an output apparatus for outputting text to a display, the text including a sequence of words associated with the sequence of character inputs; and a processor coupled to a memory, the memory including stored words, a subset of the stored words being indicative of an interrogative expression, and the processor being adapted to:
  determine whether an initial word in the text matches any words in a list of single words indicative of an interrogative expression; and
  in response to determining that the initial word in the text does not match any words in the list of single words indicative of the interrogative expression:
    determine whether a combination of the initial word and a subsequent, non-consecutive word in the text is indicative of an interrogative expression, wherein the combination is identified independent of words between the initial word and the subsequent, non-consecutive word; and
    in response to determining that the combination of the initial word and the subsequent, non-consecutive word in the text is indicative of the interrogative expression:
      automatically add an interrogative punctuation character to the text upon receipt of the user input reflecting the termination input, wherein the interrogative punctuation character is added without a user input reflecting actuation of two keys.

24. The user interface according to claim 23, wherein the subset of stored words includes a plurality of combinations of two non-consecutive words indicative of an interrogative expression.

25. The user interface according to claim 23, wherein one word is separating the combination.

26. The user interface according to claim 23, wherein two words are separating the combination.

27. The user interface according to claim 23, wherein the subsequent, non-consecutive word is in a third position of the sequence of words.

28. The user interface according to claim 23, wherein the subsequent, non-consecutive word is in a fourth position of the sequence of words.

29. The user interface according to claim 23, wherein adding the punctuation character includes inserting a "?" (question mark) at the end text, and inserting an inverted punctuation character at a beginning of the text.

30. The user interface according to claim 23, wherein the combination follows a punctuation in the text.

31. The user interface according to claim 30, wherein the punctuation in the text is one of a comma and a semi-colon.

32. The user interface according to claim 23, wherein the termination input is an actuation of a spacebar twice in succession.

33. The user interface according to claim 23, wherein the interrogative punctuation character is added to the text without actuation of an "alt" key.

* * * * *